United States Patent [19]

Gehr

[11] Patent Number: 5,029,238

[45] Date of Patent: Jul. 2, 1991

[54] NOISE SUPPRESSION CIRCUIT

[75] Inventor: Marvin M. Gehr, Lincoln, Nebr.

[73] Assignee: Telex Communications, Inc., Lincoln, Nebr.

[21] Appl. No.: 154,098

[22] Filed: Feb. 9, 1988

[51] Int. Cl.⁵ .......................................... H04B 15/00
[52] U.S. Cl. .................................... 455/222; 455/50; 455/63; 455/296
[58] Field of Search .............. 455/212, 213, 218, 219, 455/220, 222, 309, 312, 50, 63, 296; 307/542, 543; 328/149; 333/17.1, 174

[56] References Cited

U.S. PATENT DOCUMENTS

| | | | |
|---|---|---|---|
| 3,911,776 | 10/1975 | Beigel | 333/174 |
| 4,035,730 | 7/1977 | Clayton | 455/213 |
| 4,085,370 | 4/1978 | van der Poel et al. | 455/296 |
| 4,207,543 | 6/1980 | Izakson et al. | 333/17.1 |
| 4,484,358 | 11/1984 | Iwahashi | 455/213 |
| 4,731,873 | 3/1988 | Voyce | 455/219 |

Primary Examiner—Reinhard J. Eisenzopf
Assistant Examiner—Kinfe-Michael Negash
Attorney, Agent, or Firm—Vincent L. Carney

[57] ABSTRACT

To reduce noise-ups, a radio receiver includes a comparator which is electrically connected to a variable potential to set a threshold voltage and connected to the IF circuit of the radio for comparison. The output of the comparator is applied to voltage controlled resistance circuits so that as the strength of the signal drops below the threshold value, the resistances are reduced. These reduced resistances are in shunt with a filter resistor so that as the resistance drops, the frequency response of the filter is lowered. Signals from the IF stage are passed through the filter before being transmitted to the audio stage so that as the signal strength drops below the threshold value but before a complete dropout, the frequency response is lowered.

11 Claims, 1 Drawing Sheet

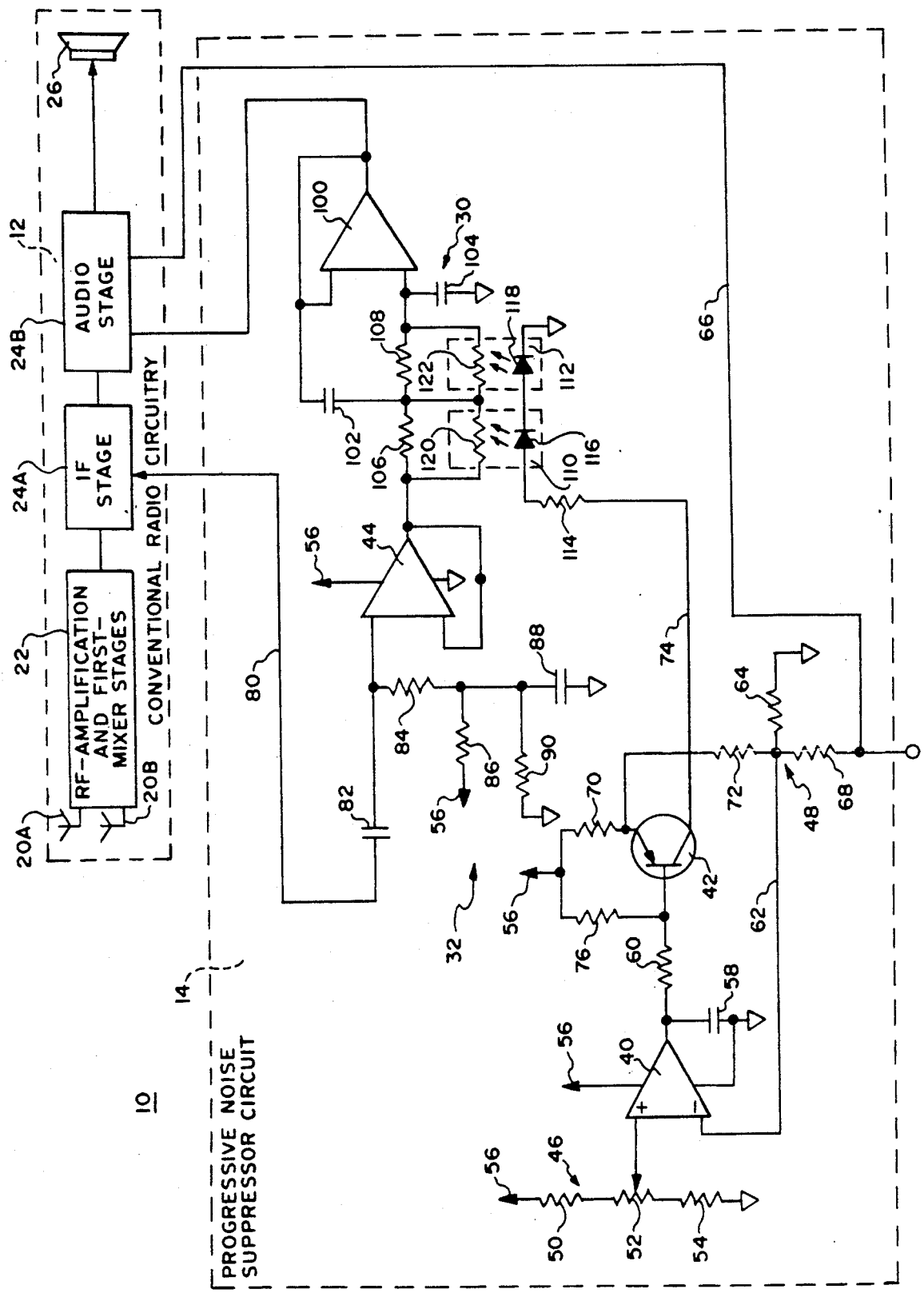

NOISE SUPPRESSION CIRCUIT

BACKGROUND OF THE INVENTION

This invention relates to radio receivers and more particularly to circuitry which reduces the noise level of radio receivers.

It is known to attenuate or block transmission to the speaker of a radio when the signal received by the radio receiver drops and thus to eliminate the sound of white noise from the speaker. It is also known in some applications, to reduce irritating high frequency noise by reducing the bandwidth of signals applied to a speaker such as in phonograph players and thus eliminate the more irritating portions of the high frequency noise.

In prior art radio circuits, a squelch circuit completely blocks noise when the received signal falls below a threshold value set at a level which would result in an incomprehensible audio signal being applied to the speaker. While filtering has long been used to remove noise, it has not been adapted in a way that removes noise-ups.

The prior art circuits have a disadvantage in that portable receivers and particularly those used in wireless microphones are often operated under conditions in which the received signal is not so low as to cause the squelch circuit to block all audio to the speaker but is sufficiently low so that substantial irritating white noise is passed to the speaker. This problem is particularly aggravated in wireless microphones because the receiver is intermittently carried into areas where fading may occur and may be repeatedly turned on and off while in such areas, resulting in frequent irritating noise-ups.

SUMMARY OF THE INVENTION

Accordingly, it is an object of the invention to provide a novel radio receiver.

It is a still further object of the invention to provide a novel method and technique for reducing noise in a radio receiver and particularly in portable radio receivers.

In accordance with the above and further objects of the invention, a first circuit means receives a radio signal, detects and amplifies it; and a second circuit means receives the demodulated, amplified radio signal and lowers the frequency of the signal permitted to pass through it to the speaker in direct relationship to the strength of the radio signal so that the frequency of the signal passed by it is lowered as the strength of the signal received by the radio receiver falls.

More specifically, the second circuit means is electrically connected to the first circuit means to lower the frequency range of the signal from said first means and apply the altered signal back to the radio receiver, whereby noise-ups are reduced in the radio receiver. Advantageously, the second circuit means includes a signal-controlled filter that energizes the second circuit means to change the frequency passed to the speaker when the signal strength drops below a threshold value set to be below full signal strength.

As can be understood from the above description, the circuit of this invention has the advantage of removing noise-ups that occur when the signal is fading to a strength below full signal strength but above the signal strength which activates the squelch circuit.

DESCRIPTION OF THE DRAWING

The drawing is a schematic circuit diagram of a radio receiver including a noise-up reduction circuit in accordance with an embodiment of the invention.

DETAILED DESCRIPTION

In the drawing, there is shown a low noise-up radio receiver 10 including conventional radio circuitry 12 and a progressive noise suppressor circuit 14, with the progressive noise suppressor circuit 14 being connected to and incorporated into the conventional radio circuitry 12.

With this arrangement, as the received signal begins dropping or fading, the progressive noise suppressor circuit 14 reduces noise-up effects caused by the gradual reduction of the signal beyond a preset threshold strength by successively changing the frequency response of the output signal in a manner that reduces its high-frequency component steadily as the strength of the received signal is reduced, thus reducing the hissing sound that would otherwise occur as the receiver is turned on and off with a low signal reception or as the received signal fades in and out.

The overall conventional radio circuitry 12 may include the components of any conventional radio receiver, but in the preferred embodiment, includes the components normally found in a portable diversity receiver such as that disclosed in U.S. Pat. No. 4,293,955. In the drawing, this receiver is illustrated as having first and second antennas 20A and 20B, an RF-amplification and first-mixer stages circuit 22, an IF stage 24A, an audio stage 24B and a speaker 26. This receiver is conventionally connected and operates in a manner known in the art.

With this type of diversity receiver, the signal is received from the first and second antennas 20A and 20B and added together either in phase or, in some cases, with a 180 degree phase reversal after the received signal falls below a predetermined strength. In spite of these precautions, and in other receivers not having diversity reception or a different type of diversity reception, the signal under certain circumstances gradually fades and thus, before the squelch circuit completely removes noise but after the signal has dropped to a value lower than that which masks or prevents all noise from reaching the speaker, there is a noise-up, high-frequency response, which if transmitted to the speaker, may be irritating to the ear.

The progressive noise suppressor circuit 14 is connected to the IF stage 24A to receive the IF signal and to the audio stage 24B to provide a signal that reduces noise-ups. It processes the signal so that, when the signal drops below a preset threshold, the higher frequencies are removed progressively so that the higher frequencies in the signal being transmitted to the speaker are eliminated in a manner substantially linear with the drop in the strength of the received RF signal. This produces a result less annoying to the user by suppressing the higher more irritating audio frequency sounds of the noise-ups.

To reduce or prevent noise-ups, the progressive noise suppressor circuit 14 includes a voltage-controlled filter circuit 30 and a control circuit 32. The control circuit 32 receives signals from the IF stage 24A and uses them to control the filtering action provided to the received signal by the voltage-controlled filter circuit 30. The output of the voltage-controlled filter circuit 30 is amplified and transmitted to the audio stage 24B for audio amplification, squelch operations and the like before being transmitted to the speaker 26.

With this arrangement, the audio frequency signals are substantially unaffected by the progressive noise suppressor circuit 14 unless the signal strength falls below a threshold value which, in the preferred embodiment, is about 30 microvolts. Whenever the signal falls below the threshold value, the voltage-controlled filter circuit 30 removes the higher frequencies to provide a lower and lower frequency band to the speaker as the signal drops lower and lower in amplitude.

To provide control signals to the voltage-controlled filter circuit 30, the control circuit 32 includes a comparator 40, a PNP transistor 42, and an operational amplifier 44. These components are connected together so that the comparator 40 detects a drop in the amplitude of the received signal and applies signals to the PNP transistor 42 to cause it to generate control signals and apply them to the voltage-controlled filter circuit 30, which signals are related to the drop in the IF signal. The operational amplifier 44 also receives the signal from the IF stage 24A and transmits it through the voltage-controlled filter circuit 30 for processing before transmitting it to the audio stage 24B.

To control the voltage-controlled filter circuit 30 and the PNP transistor 42, the comparator 40 receives the IF signal from the IF stage 24A on its inverting terminal and prevents the transistor 42 from conducting when the signal is above an amplitude threshold but permits it to conduct when the signal is below the amplitude threshold. Thus the comparator 40 causes the voltage-controlled filter circuit 30 to be increasingly active in blocking high -frequency signals as the signal received by the antenna decreases in amplitude.

To establish the threshold signal, the noninverting input terminal of the comparator 40 is electrically connected to a means for setting a threshold voltage 46 and has its inverting input terminal electrically connected to a means 48 for receiving a signal proportional to the IF signal. Its output is electrically connected to the base of the PNP transistor 42 so that when its output is positive, the PNP transistor 42 is prevented from conducting and applying a signal to the voltage-controlled filter circuit 30, but as it becomes negative it causes the PNP transistor 42 to conduct and cause the voltage-controlled filter circuit 30 to block higher frequencies and pass lower frequencies to the audio stage 24B.

To apply a threshold signal to the noninverting input terminal of the comparator 40, the means for setting a threshold voltage 46 includes a 1.2 M (megohm) resistor 50, a 50 K (kilohm) potentiometer 52 and a 110 K resistor 54. The adjustable center tap of the 50 K potentiometer 52 is directly connected to the non-inverting input terminal of the comparator 40 and has one end electrically connected through the 1.2 M resistor 50 to a source of a positive 15 volts 56 and its other end connected to AC ground through the 110 K resistor 54. With this arrangement, a positive voltage less than a positive 15 volts may be selectively electrically connected to the non-inverting terminal of the 1.2 M resistor 50.

The comparator 40 is electrically connected to a source of 15 volts as its operating potential and has its output electrically connected through a 1 microfarad capacitor 58 to AC ground. Its output is electrically connected through a 10 K resistor 60 to the base of the PNP transistor 42 to supply signals to the transistor representing the received signal strength. With this circuit arrangement, when the signal strength is dropping, the transistor 42 is caused to conduct and control the voltage-controlled filter circuit 30 to block high frequencies as the signal strength decreases.

To compare the amplitude of the received signal with the threshold value set on the 50 K potentiometer 52, the inverting terminal of the comparator 40 is electrically connected through a conductor 62 to AC ground through a 100 K resistor 64 and to conductor 66 from the IF stage 24A carrying the signal through a 4.7 K resistor 68. The conductor 66 is also electrically connected in the preferred embodiment to a diversity control circuit for the appropriate addition and subtraction of signals received on the different first and second antennas 20A and 20B but this feature is not part of the invention.

To control the frequency response of the voltage-controlled filter circuit 30, the PNP transistor 42 has its emitter electrically connected to a source of a positive 15 volts 56 through a 3.3 K resistor 70 and to conductor 62 through a 1 M resistor 72. Its collector is electrically connected through a conductor 74 to the voltage-controlled filter circuit 30 to provide signals thereto in response to changes of the potential on its base from the comparator 40.

To receive signals from the comparator 40, the base of the PNP transistor 42 is electrically connected to the output of the comparator 40 through the 10 K resistor 60 and to a source of a positive 15 volts 56 through a 15 K resistor 76 for biasing.

To provide signals to the voltage-controlled filter circuit 30 for processing therein, the operational amplifier 44 has its non-inverting input terminal electrically connected: (1) to conductor 80 carrying the signal from the IF stage 24A through a 1 microfarad capacitor 82; and (2) to a source of a positive 15 volts 56 through a series connected 100 K resistor 84 and 100 K resistor 86. The common point between the 100 K resistor 84 and 100 K resistor 86 is electrically connected to AC ground through a filter circuit having in parallel a 4.7 microfarad capacitor 88 and a 100 K resistor 90. The operational amplifier 44 is powered by a source of a positive 15 volts 56 and has its output electrically connected to its inverting input and to the voltage-controlled filter circuit 30.

To provide voltage-controlled filtering, the voltage-controlled filter circuit 30 includes an operational amplifier 100 and an input single-node active filter having: (1) a 0.01 microfarad capacitor 102; (2) a 0.0033 microfarad capacitor 104; (3) two 22 K resisitors 106 and 108; and (4) two active filter elements (voltage-controlled resistances) 110 and 112. These components are electrically connected to receive at one input of the voltage-controlled resistance 110, a control signal from the PNP transistor 42 and at the other input of the voltage-controlled resistance 110, the intermediate frequency signal from the operational amplifier 44 and to conduct a filtered intermediate signal from the output of the voltage-controlled filter circuit 30 to the audio stage 24B for appropriate filtering, detection, audio amplifying and application to the speaker 26.

To connect the output of the operational amplifier 44 to the input of the operational amplifier 100, the output of the operational amplifier 44 is electrically connected to one end of the 22 K resistor 106 and to one of the inputs of the active filter element 110. The other end of the 22 K resistor 106 is electrically connected to: (1) one plate of the 0.01 microfarad capacitor 102; (2) the noninverting terminal of the operational amplifier 100 through the 22 K resistor 108; (3) one plate of the 0.0033 microfarad capacitor 104 through 22 K resistor 108; (4) one of the outputs of the active filter element 110 through 22 K resistor 108; and (5) the input of the other active filter element 112. The other plate of the 0.0033 microfarad capacitor 104 is electrically connected to AC ground.

To supply the filtered signal back to the audio stage 24B, the output of the operational amplifier 100 is electrically connected to: (1) the audio stage 24B to provide the processed IF signal thereto; (2) its inverting input terminal; and (3) the other plate of the 0.01 microfarad capacitor 102 to complete a portion of the filtering circuit.

To vary the active filter elements 110 and 112 of the filter and thus change its pass band, the collector of PNP transistor 42 is electrically connected through the conductor 74 and through a 10 K resistor 114 to the second input of the active filter element 110. The second output of the active filter element 110 is electrically connected to the second input of the active filter element 112, the output of which is connected to AC ground.

With this arrangement, the potential on conductor 74 and the current flowing therethrough controls the resistance of the active filter elements 110 and 112 which are electrically connected in a bridge configuration with the passive 22 K resistors 106 and 108 to vary the parameters of the filter. More specifically, conductor 74 is connected through the active filter element 112 to a first LED (light emitting diode) 116 in the active filter element 110 and to a second LED 118 in the active filter element 112 so that light is emitted in proportion to the voltage on conductor 74.

The output of the operational amplifier 44 is electrically connected to a light sensitive variable resistor 120 in the active filter element 110 and a light sensitive variable resistor 122 in the active filter element 112, with the center point of 22 K resistors 106 and 108 connected between the two. With this arrangement, current flowing through the LED 116 causes the resistance of the light sensitive variable resistor 120 to be reduced and current flowing through the LED 118 causes the resistance of the light sensitive variable resistor 122 to be reduced in proportion to the voltage on conductor 74 and thus to raise the upper frequency cut-off point of the voltage-controlled filter circuit 30 by reducing the resistance in the filter. This increases the frequency applied through the audio stage 24B to the speaker 26 for strong signals and reduces it for weak signals.

The voltage-controlled filter 30 is operative in a frequency range having a high frequency cut off frequency in the range of 10 to 20 kilohertz and a low frequency cut off frequency in the range of 100 hertz to 5 kilohertz. It should be capable of variation in cut off frequency of at least 4 kilohertz as the field intensity at the antenna varies in the range of 2 microvolts per meter to 100 microvolts per meter. In the preferred embodiment the frequency range is between 2 and 17 kilohertz.

The filter can be designed with the values of signals from the control circuit to accomplish this result in a manner known in the art. To accomplish this the parameters of the circuit must be adjusted so that the signal output on conductor 66 indicating signal strength or a signal from another portion of the circuit such as from the IF stage 24A indicating signal strength controls the appropriate range of frequencies by controlling the resistance in the filter 30. The ratio of voltage of current indicating signal strength of the radio to the reduction in resistance of the filter will vary from circuit to circuit depending on the way in which the voltage or current used to provide an indication of the field intensity at the antenna varies.

In operation, signals are received which fade in intensity from time to time. When a signal has faded to an amplitude intensity less than full strength, the receiver reduces its high frequency response and thus reduces noise-up. With this ability, the receiver is particularly well adapted for wireless microphone receivers which are from time to time carried into areas of poor reception.

When the signal is of adequate amplitude and there is no fading, a relatively high amplitude signal is applied through conductor 66 and through conductor 80. The signal on 100 K resistor 86 is divided in the voltage divider that includes a 1 microfarad capacitor 58 and 100 K resistor 64 and applied from there to the inverting input terminal of the comparator 40. The signal is compared by the comparator 40 with the threshold value set in the 50 K potentiometer 52, and since the signal has a relatively high amplitude, it causes the comparator 40 to provide a negative potential to the base of the PNP transistor 42, driving it into conduction and thus causing a positive potential to be applied to the active filter elements 110 and 112. When current flows through the active filter elements 110 and 112, the LEDs 116 and 118 emit light, causing the light sensitive variable resistors 120 and 122 to be reduced in resistance.

When the light sensitive variable resistors 120 and 122 are reduced in resistance by a strong signal from the IF stage 24A to the comparator 40, a low resistance shunt path is provided from the output of the operational amplifier 44 through the light sensitive variable resistors 120 and 122 to the input of the operational amplifier 100. With this low resistance shunt path, the time constant of the filter, including the 0.01 microfarad capacitor 102, the 0.0033 microfarad capacitor 104 and the 22 K resistors 106 and 108 are changed so that relatively high frequency signals are passed to and amplified by the operational amplifier 100.

Although a specific type of voltage-controlled filter has been shown, any means for causing a reduction in the upper frequency components of the audio signal applied to the speaker 26 may be used. Among the mechanisms, there may be a shunt or series voltage-controlled or current-controlled filter which changes its pass band in accordance with the strength of the signal so that as the signal is weakened, the frequency of the pass band is lowered.

When the receiver is in a location which causes fading so that a squelch circuit is not entirely operable but the strength of the signal is dropping to cause noise-ups, the reduced signal from the audio stage 24B on conductor 66 is further reduced by the 1 microfarad capacitor 58 and 100 K resistor 64 and applied through conductor 62 to the inverting terminal of the comparator 40. This results in a more positive signal on the base of the PNP transistor 42, causing light from the LED 116 and 118 to be reduced and the resistance of the light sensitive variable resistors 120 and 122 to increase. This shifts the pass band of the filter at the input of operational amplifier 100 so that the higher frequencies are blocked and the lower frequencies passed as the resistance of the light sensitive variable resistors 120 and 122 increases. With this arrangement, the signal passing through conductor 80 from the IF stage 24A is passed through the filter so that the higher frequencies are removed before being amplified by the operational amplifier 100 and applied to the output circuitry of the audio stage 24B and from there to the speaker 26.

As can be understood from the above description, the noise-up circuit of this invention has several advantages such as: (1) it reduces the irritating high frequency sounds while still permitting weak signals to be applied to the speaker and thus be heard; and (2) it is a relatively economical and compact circuit suited for receivers within wireless microphones or other portable radio receivers.

While a preferred embodiment of the invention has been described with some particularity, many modifications and variations of the embodiment may be made without deviating from the invention. Accordingly, it is to be understood that, within the scope of the appended claims, the invention may be practiced other than as specifically described.

What is claimed is:

1. A method of removing noise comprising the steps of:
   detecting reductions in a first signal strength within an amplitude range below full strength;
   reducing a second signal frequency and applying the second signal frequency to a speaker in direct relation to the reduction in first signal strength within said range, whereby noise is reduced;
   the step of detecting the reduction in a first signal strength includes the steps of comparing the first signal to a preset threshold value and generating a control signal when the first signal strength falls below the threshold value;
   transmitting said control signal to a signal controlled filter, wherein the signal controlled filter begins to reduce its pass frequency as the signal received by a radio receiver fades and drops below the preset threshold value; and
   transmitting the radio signal through said signal controlled filter enroute to the speaker prior to reaching an automatic gain control and a squelch circuit.

2. A method of removing noise according to claim 1 in which a frequency response of said signal controlled filter is reduced proportionally to the drop in said signal strength.

3. A method of removing noise comprising the steps of:
   detecting reductions in a first signal strength within an amplitude range below full strength; and
   reducing a frequency of a second signal applied to a speaker in direct relation to the reduction in first signal strength within said range, whereby noise is reduced;
   the step of detecting reductions in first signal strength within an amplitude range below full strength includes the step of detecting first signal strength resulting from a field intensity at the antenna in a range of between 2 microvolts per meter and 100 microvolts per meter.

4. A circuit for reducing noise within a radio receiver comprising:
   means for obtaining a signal representative of the strength of the signal received by said radio receiver;
   frequency control circuit means for altering a frequency band of signals passing through it in response to the signal representative of the strength of the signal received by said radio receiver so that as said signal strength is reduced, the frequency response of said frequency control circuit means is lowered;
   said frequency control circuit means being electrically connected to said means for obtaining a signal for altering the frequency band of said frequency control circuit means;
   said frequency control circuit means being electrically connected within said radio receiver in an electrical path that causes a modulated signal to pass through it before permitting the modulated signal to pass to a speaker;
   the means for obtaining a signal representative of the signal strength including a comparator circuit means having first and second inputs for generating a signal representative of the difference between the potentials on said first and second inputs;
   said first input being electrically connected to receive said signal representative of the signal within said radio receiver and said second input being electrically connected to a reference potential whereby an output signal from said comparator circuit means is representative of the strength of the signal received by said radio receiver.

5. A circuit according to claim 4 in which said frequency control circuit means includes a signal controlled filter that causes the frequency response of the frequency control circuit means to be lowered in proportion to the amount the strength of the signal received by said radio receiver falls while said signal received by said radio receiver is within a range between full strength and a strength at which a squelch circuit is designed to be activated.

6. A circuit for reducing noise within a radio receiver comprising;
   means for obtaining a signal representative of strength of the signal received by said radio receiver;
   frequency control circuit means for altering a frequency band of signals passing through it in response to the signal representative of the strength of the signal received by said radio receiver so that as said signal strength is reduced, the frequency response of said frequency control circuit means is lowered;
   said frequency control circuit means being electrically connected to said means for obtaining a signal for altering the frequency band of said frequency control circuit means;
   said frequency control circuit means being electrically connected within said radio receiver in an electrical path that causes a modulated signal to pass through it before permitting the modulated signal to pass to a speaker;
   said frequency control circuit means including a filter and means for reducing the cut off frequency of the filter by at least 4 kilohertz as the signal strength of an antenna means falls within a range of 100 microvolts per meter to 2 microvolts per meter in field intensity.

7. A circuit in accordance with claim 6 in which the means for reducing the cut off frequency of a filter includes control circuit means for generating a signal proportional to the field intensity at the antenna and means for varying the potential at a voltage controlled filter connected in circuit with an audio stage of the radio receiver.

8. A radio receiver comprising:

antenna means for receiving a radio signal;

PF circuit means for detecting and amplifying said radio signal, whereby an IF signal is obtained;

IF circuit means for detecting and amplifying said IF signal;

means for obtaining a signal from said IF signal that is representative of strength of the signal received by said radio receiver;

frequency control circuit means for altering a frequency band of signals passing through it in response to the signal representative of the strength of the signal received by said radio receiver so that as said signal strength is reduced, the frequency response of said frequency control circuit means is lowered;

said frequency control circuit means being electrically connected to said means for obtaining a signal for altering the frequency band of said frequency control circuit means;

said frequency control circuit means being electrically connected within said radio receiver in an electrical path that causes a modulated signal to pass through it before permitting the modulated signal to pass to a speaker;

the means for obtaining a signal representative of the signal strength including a comparator circuit means having first and second inputs for generating a signal representative of the difference between the potentials on said first and second inputs;

said first input being electrically connected to receive said signal representative of the signal within said radio receiver and said second input being electrically connected to a reference potential whereby an output signal from said comparator circuit means is representative of the strength of the signal received by said radio receiver.

9. A radio receiver according to claim 8 in which said control circuit means electrically connected to said means for obtaining a signal includes a circuit means for applying a signal to said frequency control circuit means that causes its frequency response to be lowered in proportion to the amount the strength of the signal received by said radio receiver falls while said signal is within the range between full strength and the strength at which a squelch circuit is designed to be activated; and said frequency control circuit means includes a signal controlled filter having a response controlled by said signal.

10. A method of removing noise from a radio receiver that processes signals, which radio receiver has a squelch circuit and a speaker, wherein one of the signals is an audio signal comprising the steps of:

detecting reductions in signal strength in at least one of said signals at least within an amplitude range below full strength and a value that causes the squelch circuit to block transmission of the audio signal to the speaker; and reducing a frequency of the audio signal applied to the speaker in direct relation to the reduction in the detected signal strength within said range, whereby noise is reduced.

11. A method of removing noise according to claim 10 wherein the radio receiver also includes a filter and the step of reducing a frequency applied to a speaker includes the step of reducing the cut off frequency of the filter by at least 4 kilohertz as the signal strength received by an antenna means falls and transmitting an audio signal through the filter before it is applied to the speaker.

* * * * *